United States Patent [19]

Coran et al.

[11] 4,297,453
[45] Oct. 27, 1981

[54] COMPOSITIONS OF EPICHLOROHYDRIN RUBBER AND NYLON

[75] Inventors: Aubert Y. Coran; Raman Patel, both of Akron, Ohio

[73] Assignee: Monsanto Company, St. Louis, Mich.

[21] Appl. No.: 149,075

[22] Filed: May 12, 1980

[51] Int. Cl.³ .................. C08L 71/02; C08L 77/00
[52] U.S. Cl. .................. 525/408; 260/45.75 N; 525/430
[58] Field of Search .................. 525/408, 430

[56] References Cited

U.S. PATENT DOCUMENTS 3,453,357  7/1969  Loean .................. 525/408
4,173,556  11/1979  Coran et al. .................. 260/30.8 R
4,174,358  11/1979  Epstein .................. 525/183

FOREIGN PATENT DOCUMENTS 50-35259  4/1975  Japan .

*Primary Examiner*—Paul Lieberman
*Attorney, Agent, or Firm*—Larry R. Swaney

[57] ABSTRACT

Compositions are described comprising blends of cured epichlorohydrin rubber and nylon.

22 Claims, No Drawings

COMPOSITIONS OF EPICHLOROHYDRIN RUBBER AND NYLON

This invention relates to polymer blend compositions and, more particularly, to thermoplastic compositions comprising blends of nylon and cured epichlorohydrin rubber.

BACKGROUND OF THE INVENTION

Thermoplastics are compositions which can be molded or otherwise shaped and reprocessed at temperatures above their melting or softening points. Thermoplastic elastomers (elastoplastics) are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming, and, in addition, many thermoplastics can be thermally welded.

Moldable thermoplastic compositions of nylon and uncured epichlorohydrin rubber containing high proportions of nylon and exhibiting high impact strength are known but such compositions are rigid materials of high stiffness and low elongation (Epstein, U.S. Pat. No. 4,174,358). Moldable elastoplastic compositions of nylon and cured high unsaturation diene rubbers containing high proportions of rubber are known (A. Y. Coran and R. Patel, U.S. Pat. No. 4,173,556).

SUMMARY OF THE INVENTION

It has been discovered that compositions comprising blends of thermoplastic nylon and cured epichlorohydrin rubber exhibit a valuable combination of properties. Generally, compositions comprising about 5–95 parts by weight of nylon and, correspondingly, 95–5 parts by weight of cured epichlorohydrin rubber are moldable thermoplastic compositions exhibiting improved strength, great elongation, greater toughness or impact resistance, or improve true stress at break. A preferred composition comprises a blend of about 20–80 parts by weight of nylon and, correspondingly, about 80–20 parts by weight of cured epichlorohydrin rubber. Cross-linking the rubber increases the tensile strength and improves tension set and toughness of the composition. In addition, cross-linking the rubber improves the solvent resistance and the high temperature properties of the blend. The properties of the composition improve as the extent of cross-linking the rubber increases. In preferred compositions, the epichlorohydrin rubber is cured to the extent that no more than 20 weight percent, preferably no more than 10 weight percent of the rubber is extractable in a solvent in which uncured epichlorohydrin rubber is essentially completely soluble. Compositions comprising 55 or more parts by weight of nylon, per 100 parts by weight of both the nylon and the cured epichlorohydrin rubber, are thermoplastic compositions exhibiting improved impact resistance. Compositions comprising 45 or more parts by weight of cured epichlorohydrin per 100 parts by weight of both the said rubber and the nylon are elastomeric. When compositions containing high proportions of rubber are statically cured, such as in molds, thermoset compositions are obtained; whereas, if such compositions are dynamically cured, i.e., if the blend is masticated while the rubber is cured, elastoplastic compositions are obtained which compositions exhibit elastomeric properties and yet are processable as thermoplastics.

The relative proportions of nylon and cured epichlorohydrin rubber of the elastoplastic compositions of the invention are not subject to absolute delineation because the limits vary, due to a number of factors including type, molecular weight, or molecular weight distribution of the nylon or rubber, the type of rubber, and type and amount of curative used to cure the rubber. In elastoplastic compositions, the amount of nylon must be sufficient to impart thermoplasticity to the compositions, and the amount of cured epichlorohydrin rubber must be sufficient to impart rubberlike elasticity to the composition. The term "rubberlike elasticity" means for the composition to have a tension set values of about 50% or less. The range of proportions for which the compositions are elastoplastic may be ascertained in a few simple experiments by those skilled in the art by following the teachings herein. Generally, elastoplastic compositions of the invention are blends which comprise about 20–55 parts by weight of nylon and correspondingly about 80–45 parts by weight of cured epichlorohydrin rubber per 100 total parts by weight of nylon and rubber. Blends containing lower proportions of nylon exhibit better tension set, whereas, blends containing higher proportions of nylon generally exhibit higher stress-strain properties, including true stress at break, TSB.

It is important for thermoplasticity that the cured rubber is present in the form of small dispersed particles, otherwise, the composition will either be weak or not processable as a thermoplastic. If the rubber is not dispersed and forms a somewhat continuous phase throughout the blend, a thermoset composition, not processable as a thermoplastic, may be obtained. The dispersed rubber particles must be small enough to maintain strength and thermoplasticity of the composition. If the particles are too large, weak, low strength blends are obtained. Compositions containing still larger particles may not be processable as thermoplastics. Accordingly, it is understood that in elastoplastic compositions of the invention, the particle size is small enough to maintain high strength and thermoplasticity. Generally, the cured rubber particles are of a size of about 50 microns number average or less. The smaller the particle size the better the properties, including strength and processability. Preferably, the particle size is about 10 microns number average or less. The dynamic curing process, when carried out properly, can give cured rubber particles within the range of about 0.1 to 2 microns number average.

In order to achieve the improved compositions of the invention, it is essential that the rubber is cured with enough rubber curative so that the rubber is cured sufficiently to give a composition having a substantially greater ultimate elongation than a corresponding blend containing uncured rubber. Preferably sufficient rubber curative is used to also give a significant increase in tensile strength. In a preferred composition, the extent of cure of the rubber is such that the true stress at break, TSB, is at least two times the TSB of the similar blend in which the rubber is uncured.

Elastoplastic compositions of the invention are preferably prepared by a dynamic curing process which comprises masticating a mixture of melted nylon, epichlorohydrin rubber, and curative at a curing temperature until curing is complete. Conventional rubber masticating equipment, for example, Banbury Mixers, Brabender Mixers, and mixing extruders, may be used to carry out the dynamic vulcanization process. The nylon and epichlorohydrin rubber typically are mixed at a temperature above the nylon melting point, after which curative is added. Mastication at vulcanization temperature is continued until vulcanization is complete, generally within a few minutes, depending on the temperature. To obtain thermoplastic elastomeric compositions, it is desirable that mixing continues without interruption until vulcanization is complete. If appreciable curing is allowed after mixing has stopped, a thermoset unprocessable composition may be obtained. Frequently, the cured blend is removed from the mixer and cooled, then returned and masticated again above the melting point of the nylon. The additional mastication step may generally improve the processability of the composition, especially when higher proportions of rubber are used. For further details concerning dynamic vulcanization and determination of the extent of cure of the rubber, refer to the Coran et al patent, supra, particularly Columns 3 and 4.

The particular results obtained by the aforesaid dynamic curing process are a function of the particular rubber curing system selected. Preferably, enough curative is used to cross-link the rubber to the extent that the cross-link density of the rubber is in the order of about $3 \times 10^{-5}$ to $3 \times 10^{-4}$ moles per milliliter of rubber. Of course, the cross-link density should not be too high lest the properties of the composition be impaired.

One embodiment of the invention consists of a thermoset composition comprising a blend of nylon and cured epichlorohydrin rubber which is in the form of a continuous network rather than being in particulate form. Thermoset compositions of the invention are prepared by first blending nylon and epichlorohydrin rubber at a temperature sufficient to melt the resin using conventional masticating equipment. The composition is then worked on a rubber roll mill where curatives are incorporated therein at a temperature below the activation temperature of the curative system. (The temperature is generally also below the melting point of the nylon in which case nylon is the particulate phase, especially after mill working.) The curable composition is then sheeted by passage through the roll mill or a shaped specimen is otherwise prepared. The sheet or shaped specimen is then cured by conventional means, typically by heating under pressure. The specimens may be cured either above or below the melting point of the nylon. When a specimen is cured below the melting point of the nylon, the physical properties of the cured specimen may be dependent upon the direction of measurement because of orientation of nylon particles. The degree of anisotropy of any particular specimen depends upon the proportions of nylon in the blend and the degree of orientation. Orientation of the nylon particles can be conveniently achieved by passing a sheeted material one or more times through the rolls of an even speed mill.

Methods other than dynamic vulcanization can be utilized to prepare thermoplastic elastoplastic compositions of the invention. For example, epichlorohydrin rubber can be fully vulcanized in the absence of the nylon, comminuted, and mixed with molten nylon. Provided that the cured rubber particles are small, well dispersed and in an appropriate concentration, compositions within the invention are obtained by blending cured epichlorohydrin rubber and nylon. In addition, providing enough nylon is present, thermoplastic compositions may be prepared by masticating a blend of nylon and epichlorohydrin rubber, incorporating curatives and then curing under static conditions, such as, in a mold.

Thermoplastic compositions of the invention are all processable in an internal mixer, to give products which, upon transferring at temperatures above the softening or crystallizing point of the nylon to the rotating rolls of a rubber mill, form continuous sheets. The sheets are reprocessable in the internal mixer, after reaching temperatures above the softening or melting point of the nylon. The material is again transformed to the plastic state (molten state of the nylon) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, thermoplastic compositions of the invention are further processable to the extent that articles may be formed therefrom by extrusion, injection molding or calendering.

Epichlorohydrin rubbers satisfactory for the practice of the invention are rubbery homopolymers of epichlorohydrin (ASTM type CO) and rubber copolymers of epichlorohydrin with ethylene oxide (ASTM type ECO). A suitable copolymer rubber may contain a small quantity of a third monomer to introduce enough olefinic unsaturation into the molecule to make the rubber vulcanizable with a sulfur vulcanization system. Epichlorohydrin homopolymer and copolymer rubbers are "cured" (cross-linked) with difunctional vulcanizing agents such as polyamines and thioureas. Examples of suitable vulcanizing agents are hexamethylene diamine carbamate, hexamethylenetetramine, mixed polyamines, 2-mercaptoimidazoline, ethylenethiourea, 1,3-diethylthiourea, piperazine hexahydrate and trimethylthiourea. Unsaturated epichlorohydrin rubbers may also be vulcanized with sulfur cure systems suitable for other low unsaturation diene type rubbers. Epichlorohydrin rubber is commercially available under the trademarks of Hydrin ® Elastomers and Herchlor ® Rubber. Epichlorohydrin homopolymer rubber is sold under the tradename of Hydrin 100 and Herchlor H. Epichlorohydrin compolymer rubber is sold under the tradenames of Hydrin 200 and 270 and Herchlor C. Sulfur curable epichlorohydrin copolymer rubber containing about 2% unsaturation is sold under the tradename of Hydrin 400.

Suitable thermoplastic nylons comprise crystalline or resinous, high molecular weight solid polymers including copolymers and terpolymers having recurring amide units within the polymer chain. Both fiber-forming and molding grade nylons are satisfactory. Crystalline nylons having a softening or melting points between 160°–250° C. are preferred. Examples of suitable nylons are described in Coran et al patent, supra, particularly Column 7, lines 4–30, the disclosure of which is incorporated herein by reference.

The properties of the compositions of the invention may be modified by addition of ingredients which are conventional in the compounding of epichlorohydrin rubber and nylon. Examples of such ingredients include carbon black, silica, titanium dioxide, pigments, clay, silanes, titanates or other coupling agents, stabilizers, antidegradants, plasticizers, processing aids, adhesives, tackifiers, wax, and discontinuous fibers such as wood cellulose or glass fibers, etc. The addition of particulate filler, preferably prior to dynamic vulcanization, is particularly recommended. Preferably, the particulate filler is masterbatched with the epichlorohydrin rubber and the masterbatch is then mixed with the nylon. Particulate fillers such as carbon black, silica, or silane-treated clay, improve the tensile strength. Typical additions of particulate fillers or reinforcement fillers such as carbon black comprise about 20-150 parts by weight of filler per 100 parts by weight of rubber. The amount of particulate filler which can be used depends, at least in part, upon the type of filler and the presence of other ingredients such as plasticizers.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with other thermoplastics, in particular, various nylons, and polyester resins. The compositions of the invention are blended with thermoplastics by using conventional mixing equipment. The properties of the blend depend upon the proportions.

Tensile properties of the compositions are determined by ASTM procedure D-638. Specimens are pulled with a tensile tester at 20 inches per minute to failure. The term "elastomeric" as used herein and in the claims means a composition which possesses the property of forcibly retracting within ten minutes to less than 160% of its original length after being stretched at room temperature to twice its unstressed length and held for ten minutes before release. True stress at break (TSB) is the tensile strength at break multiplied by the extension ratio also at break, extension ratio being the length of a tensile test specimen at break divided by the original, unstressed length of the test specimen. Alternately, extension ratio is 1.00 plus 1/100 of the present ultimate elongation. Especially preferred compositions of the invention are rubbery compositions having tension set values of about 50% or less which compositions approximate the definition for rubber as defined by ASTM Standards, Vol. 28, page 756 (D1566). More preferred compositions are compositions having a Shore D hardness of 60 below or a 100% modulus between 2-20 MPa (megapascals) or a Young's modulus below about 600 MPa.

DESCRIPTION OF THE PREFERRED EMBODIMENTS

Compositions illustrating the invention are prepared by charging nylon and epichlorohydrin rubber, in the indicated amounts (all parts by weight) to a Brabender mixer at about 180°-220° C., depending upon the nylon melting temperature, and at a mixing speed of between about 50-120 rpm, generally, 80 rpm after the nylon is melted. The rubber and nylon are mixed for a sufficient time to melt the nylon and to obtain a uniform blend (about 2-3 minutes). Curative is added and mastication is continued (generally between 2 and 6 minutes) until maximum Brabender consistency is reached. The composition is removed, cooled, and then returned to the Brabender mixer and mixed an additional 2-2½ minutes. The material is then sheeted and compression molded at about 225°-250° C., again depending upon the nylon melting temperature. Properties of the molded sheet are then measured and recorded.

Materials used to illustrate the invention are as follows: Epichlorohydrin rubber comprising a copolymer of epichlorohydrin and ethylene oxide was purchased as Hydrin ® 200 Elastomer. Sulfur vulcanizable epichlorohydrin rubber, believed to be a copolymer of epichlorohydrin, ethylene oxide and sufficient olefinic monomer to give about 2% residual olefinic unsaturation, was purchased as Hydrin ® 400 Elastomer. The nylons used are nylon 6,66, m.p. 213° C., a polymer of caprolactam, hexamethylenediamine and adipic acid; nylon 6,66,610, m.p. 160° C., a terpolymer of the monomers of nylon 6, (50%), nylon 66, (31%), and nylon 610, (19%). Nickel dibutyldithiocarbamate is used as a heat stabilizer.

Compositions comprising blends of nylon 6,66 and epichlorohydrin rubber, Hydrin 400, in which the rubber is cured with sulfur curative are shown in Table 1. The effect of the proportions of rubber and nylon is also shown. The curative comprises 1.0 part of 2-mercaptobenzothiazole, 1.67 parts of zinc oxide, 1.27 parts of tetramethylthiuram sulfide and 1.5 parts of spider sulfur per 100 parts by weight of rubber except for Stock 1 which contains ½ these amounts. Control stocks are prepared without curatives. The properties of the controls are given without parentheses and the properties of the compositions containing cured epichlorohydrin rubber are shown in parentheses. The data show that curing the rubber substantially improves the properties. For example, curing increases tensile strength in all compositions containing 30 or more parts by weight rubber and increases elongation in all compositions. The improvement in true stress at break is greater in compositions containing higher proportions of rubber. All compositions are processable as thermoplastics. Cured compositions containing 50 weight percent or less of nylon are elastomeric. The high gel content (low solubility) of the cured compositions is indicative of the extent of cure of the rubber.

Compositions comprising blends of nylon 6,66,610 and different rubbers are illustrated in Tables 2 and 3. Different curatives are also illustrated. The curatives are: trimethylol propane methacrylate, SR-350; trimethylol propane acrylate, SP-351; m-phenylene bis-maleimide, HVA-2; 2,5-dimethyl-2,5 di(tert-butylperoxy)-hexane, a peroxide; low molecular weight liquid polyamine, amine number 370-400, Versamid 150; and bis-(2-benzothiazolyl) disulfide, MBTS.

TABLE 1

|  | 1 | 2 | 3 | 4 | 5 | 6 | 7* | 8* | 9* |
|---|---|---|---|---|---|---|---|---|---|
| Epichlorohydrin Rubber | 90 | 80 | 70 | 60 | 50 | 40 | 30 | 20 | 10 |
| Nylon 6,66 | 10 | 20 | 30 | 40 | 50 | 60 | 70 | 80 | 90 |
| Stabilizer | 0.81 | 1.44 | 1.26 | 1.08 | 0.9 | 0.72 | 0.54 | 0.36 | 0.18 |
| Curative | 2.45 | 4.36 | 3.81 | 3.26 | 2.72 | 2.18 | 1.63 | 1.08 | 0.54 |
| Properties |  |  |  |  |  |  |  |  |  |
| TS, MPa | — | 0.7 | 0.5 | 3.8 | 6.1 | 13.3 | 22.2 | 28.0 | 48.9 |
|  | (5.0) | (12.5) | (13.6) | (22.3) | (23.6) | (29.0) | (32.4) | (36.1) | (41.7) |

TABLE 1-continued

|  | 1 | 2 | 3 | 4 | 5 | 6 | 7* | 8* | 9* |
|---|---|---|---|---|---|---|---|---|---|
| $M_{100}$, MPa | (2.0) | (6.9) | (9.6) | (15.3) | (20.6) | (28.1) | (32.7) | (36.1) | (—) |
| E, MPa | — | 2.3 | 5.5 | 67 | 323 | 617 | 1168 | 1336 | 1477 |
|  | (2.7) | (26.3) | (70.6) | (22.6) | (412) | (983) | (3622) | (1120) | (1365) |
| Elong., % | — | 89 | 31 | 17 | 6 | 6 | 6 | 32 | 11 |
|  | (250) | (240) | (208) | (300) | (210) | (200) | (120) | (100) | (43) |
| TSB, MPa | — | 1.4 | 0.7 | 4.4 | 6.4 | 14.1 | 23.5 | 50.1 | 54.3 |
|  | (17.3) | (42.8) | (42.0) | (88.4) | (72.3) | (86.4) | (71.7) | (72.9) | (59.7) |
| Tension Set, % | (3) | (9) | (24) | (36) | (45) | (59) | (—) | (—) | (—) |
| $CH_2Cl_2$ Soluble, wt. % | (9.3) | (6.7) | (5.1) | (4.5) | (4.8) | (3.3) | (0.6) | (2.9) | (2.2) |

*Stocks 7–9 were tested according to ASTM D1708–66 by pulling the specimens at one inch per minute up to 30% elongation and then at 10 inches per minute to failure.

TABLE 2

|  | 1 | 2 | 3 | 4 |
|---|---|---|---|---|
| Hydrin® 200 Elastomer | 50 | 50 | 50 | 50 |
| Nylon 6,66,610 | 50 | 50 | 50 | 50 |
| Zinc Stearate | — | 1.67 | 1.67 | 1.67 |
| SR-350 | — | 1.33 | — | — |
| HVA-2 | — | — | 1.33 | — |
| Peroxide | — | 0.5 | 0.5 | — |
| Versamid 150 | — | — | — | 5 |
| Properties |  |  |  |  |
| TS, MPa | 8.3 | 19.5 | 26.2 | 31.7 |
| $M_{100}$, MPa | — | 12.5 | 12.5 | 5.24 |
| E, MPa | 86 | 138 | 152 | 26.7 |
| Elong., % | 100 | 350 | 340 | 390 |
| TSB, MPa | 16.6 | 87.2 | 116 | 155 |
| Tension Set, % | Bk | 67 | 70 | 38 |

TABLE 3

|  | 1 | 2 | 3 | 4 | 5 |
|---|---|---|---|---|---|
| Hydrin® 400 Elastomer | 50 | 50 | 50 | 50 | 50 |
| Nylon 6,66,610 | 50 | 50 | 50 | 50 | 50 |
| Zinc Stearate | — | 1.67 | 1.67 | 1.67 | 1.67 |
| SR-351 | — | 1.33 | — | — | — |
| HVA-2 | — | — | 1.33 | — | — |
| Peroxide | — | 0.5 | 0.5 | — | — |
| MBTS | — | — | — | 1.0 | — |
| Sulfur | — | — | — | 0.4 | — |
| Versamid 150 | — | — | — | — | 5.0 |
| Properties |  |  |  |  |  |
| TS, MPa | 7.5 | 19.1 | 28.1 | 22.0 | 24.9 |
| $M_{100}$, MPa | — | 7.7 | 9.5 | 6.9 | 8.8 |
| E, MPa | 70 | 53 | 84 | 52 | 74 |
| Elong., % | 47 | 360 | 370 | 660 | 350 |
| TSB, MPa | 11.0 | 87.1 | 133 | 166 | 112 |
| Tension Set, % | Bk | 58 | 52 | 47 | 35 |

Stock 1 is a control containing no curative. The data show that curing the rubber improves the stress-strain properties of the blends with substantial improvements in tensile strength, elongation, true stress at break, and tension set. The polyamide cross-linking agent gives better results with saturated epichlorohydrin rubber, Table 2. In blends containing sulfur curable epichlorohydrin rubber, Table 3, HVA-2 gives a greater increase in tensile strength, sulfur curative gives a greater increase in elongation, and Versamid gives a greater improvement in tension set.

Although the invention has been illustrated by typical examples, it is not limited thereto. Changes and modifications of the examples of the invention herein chosen for purposes of disclosure can be made, which changes do not constitute departures from the spirit and scope of the invention.

The embodiments of the invention in which an exclusive property or privilege is claimed are defined as follows:

1. A composition comprising a blend of about 20–55 parts by weight of nylon, and, correspondingly, about 80–45 parts by weight of cured epichlorohydrin rubber.

2. The composition of claim 1 which comprises 50 or more parts by weight of epichlorohydrin rubber and which is elastomeric.

3. The composition of claim 2 in which the rubber is in the form of discrete dispersed particles and the composition is processable as a thermoplastic.

4. The composition of claim 3 in which the rubber is cured to the extent that no more than 20 weight percent of the rubber is extractable in a solvent in which uncured epichlorohydrin rubber is essentially completely soluble.

5. The composition of claim 4 in which the nylon has a melting point between about 160°–250° C.

6. The composition of claim 5 in which the epichlorohydrin rubber is a homopolymer of epichlorohydrin or a copolymer of epichlorohydrin and ethylene oxide.

7. An elastoplastic composition comprising a blend of about 20–55 parts by weight of nylon, and correspondingly, about 80–45 parts by weight of cured epichlorohydrin rubber in the form of dispersed particles of a size small enough to maintain thermoplasticity of the composition.

8. The composition of claim 7 in which the rubber is cured to the extent that no more than 10 weight percent of the rubber is extractable in a solvent in which uncured epichlorohydrin rubber is essentially completely soluble.

9. The composition of claim 8 in which the cured rubber particles are of a size of about 50 microns number average or less.

10. The composition of claim 9 in which the cured rubber particle size is about 0.1 to 10 microns number average.

11. The composition of claim 10 in which the cured rubber particle size is 2 microns or less.

12. The composition of claim 10 in which the rubber is cross-linked to the extent that the cross-link density of the rubber is about $3 \times 10^{-5}$ to $3 \times 10^{-4}$ moles per milliliter of rubber.

13. The composition of claim 12 in which the nylon has a melting point between about 160°–250° C.

14. The composition of claim 13 in which the epichlorohydrin rubber is a homopolymer of epichlorohydrin or a copolymer of epichlorohydrin and ethylene oxide.

15. The composition of claim 14 in which the rubber is cured with a polyamine cross-linking agent.

16. The composition of claim 14 in which the epichlorohydrin rubber is sulfur vulcanizable.

17. The composition of claim 16 in which the rubber is cured with sulfur curative.

18. The composition of claim 14 in which the rubber is a homopolymer of epichlorohydrin.

19. The composition of claim 14 in which the rubber is a copolymer of epichlorohydrin and ethylene oxide.

20. The composition of claim 18 in which the nylon is Nylon 6,66,610.

21. The composition of claim 19 in which the nylon is Nylon 6,66,610.

22. The composition of claim 19 in which the nylon is Nylon 6,66.

* * * * *